(12) United States Patent
Weeks

(10) Patent No.: X9815
(45) Date of Patent: Jun. 30, 1836

(54) BEE-HIVE

(76) Inventor: James M. Weeks

John M. Weeks Salesbury Vermont.

Letters Patent.

The Schedule referred to in these Letters Patent and making part of the same containing a description in the words of the said John M Weeks himself, of his improvement in the Bee Hive.

To all to whom these presents shall come.

Be it known that I John M. Weeks of Salesbury, in the County of Addison and State of Vermont have invented a new and useful improvement in the construction of the Bee Hive, which shall hereafter be known by the name of the Vermont Bee Hive; and that the following is a full and exact descrip=tion of said Hive: This Hive is a box made of inch boards forming two apartments, one in the lower part of the Hive in which the bees perform their ordinary labors, and a Chamber for purposes hereinafter specified, it is composed of the following parts, to wit, one board 23 inches long - 15 inches wide. which forms the front of the hive: Two boards 23 inches long on the front edge - 15 inches wide on the top 13 7/8 inches wide at the base and 15 inches wide eight inches from the top, which form its two sides, one board 12 1/2 inches long & 13 inches wide, which forms the back of the lower apartment to which a button is attached on its lower edge, to govern the bottom board and ventilate the hive. One board 11½ inches square with a rabiting on the lower edge of its rear, 14 inches long corresponding with rabitings in the sides and partition board, to let in the door of the Chamber, which forms the top of the hive. One board 15 inches long & 13 3/4 inches wide with a rabbiting on the upper side of its rear edge, inserted, horizontally, into grooves in the sides of the hive, eight inches from the top, which divides the hive in to two compartments apartments. Through this board are four apertures, affording the means of communication between the said apartments. One board 14 inches long and 7 inches wide, which forms the door to the chamber of the hive, secured by a cross bar inserted into staples. One board fifteen inches square, which forms the bottom of the hive. This bottom board is suspended from the hive, by four hooks near the corners of the hive, the upper end of which are attached to staples in the sides of the hive & the lower ends of which are inserted into staples, or brought around nails, attached to the sides of the ~~bottom~~ board. The positions of these last mentioned staples or nails are such, that when the hooks are attached to them, the lower parts of the hooks are, compared with their upper ends, inclined forward, so that when the bottom board is left unrestrained by the button in the rear of the hive, it will fall back, so far as to bring the hooks into a perpendicular position, whereby it will, by reason of the upward inclination of the back part of the bottom board, recede from the hive, and leave an opening all round. This opening will be greater or less, according to the greater or less inclination of the lower parts of the hooks above mentioned. Two cleats are attached to the sides of the hive to suspend it on a frame, or in an apiary, as the case may be. The upper part of the hive is occupied by one or more drawers as may be found convenient. Drawer No. 1, is made of boards one fourth of an inch thick the sides of which are 14 inches long and 5½ inches wide the ends 11½ inches long and 5½ inches wide, with windows in one or both, to enable the observer to ascertain the state of the bees — the top and bottom of which are 14 inches long and 12¾ inches wide with apertures through the bottom, corresponding in size and number to those through the floor of the chamber as before described.

Drawers No. 2. are made of like materials, the sides of which are 14 inches long & 5½ inches wide — the ends 5¾ inches long and and 5½ inches wide with a window at one or both ends the top
and bottom of which are 14 inches long and 6½ inches wide
with apertures through the bottom corresponding to those through
the floor of the chamber. There are two Metallic slides, each
14 inches long and 12½ inches wide, to be placed under box No. 1;
and there are four other Metallic slides, each 14 inches long,
and 6½ inches wide, two of which are to be placed under each
of the boxes No. 2. said slides to be used in the manner, and for
the purpose hereinafter described. This hive may be varied
in its dimensions to suit the convenience or pleasure of the
owner, and the number of drawers may be increased if so
found necessary or expedient.

What I claim as my own invention and not previous-
ly known in the above described hive is:

First. The suspending of the bottom board from the hive
by means of the staples and hooks and placing the same
so under the control of the button mentioned in the fore-
going description that the hive may be opened and closed
for the purposes of ventilation, of preventing robberies by
the bees from other hives and of cleaning the hive, at the
pleasure of the owner. And while I do not claim as my
invention the said boxes, separately and independently of
the combinations and uses hereinafter described, nor the
use of single slides, I do claim as my invention and im-
provement. Secondly, the double slides above mentioned,
and the combination of the said boxes with the double slides,
and the said combination of boxes and double slides in
connection with the said suspended bottom board and
with the uses and purposes hereinafter specified, namely
Specification of the uses of the drawers & slides & the manner
of using them. First: to remove extra pure honey, insert
one of the slides between the drawer you wish to remove
and the floor of the chamber so far as to intercept the communication between the lower apartment and the drawer, then insert a second slide immediately above the former one, so far as to intercept the communication from the drawer downwards after which remove the drawer, taking care to keep the apertures of the same closed by means of the upper slide; place the drawer thus removed a short distance from the apiary or hive and cover the windows; remove the slide and the bees contained in the drawer ~~con-~~ ~~tained in the drawer~~ will soon return to the hive from whence the same was taken; insert an empty drawer in the place of the one removed, draw out the first slide and the bees will immediately resume their labors. In this way pure honey may be abstracted from the hive without loss of Bees and without danger from them.

Secondly. To multiply swarms of bees. Take drawer No. 1, containing bees and brood comb — place the same in a chamber of an empty hive — close the entrances of both hives so as to prevent the egress of the bees — let them remain three or four days supplying each hive daily with clean water then open the entrances of each and you have the swarms or separate colonies. — Thirdly. To equalize swarms by doubling, trebling or quadrupling them; when swarms come forth and are found to be very unequal in numbers and it is desirable that each colony should be made equal on the same apiary, put a small swarm into the lower apart-ment of an empty hive — a second small swarm into drawer No. 2, a third small swarm if necessary, into another drawer No. 2. then place the drawers in the chamber of the hive — withdraw the slides and the two or three swarms as the case may be, will immediately amalgamate in the lower apartment of the hive, in which case one or more smaller swarms may be added, as may be found necessary.

Fourthly. To make Queen bees and keep them on hand hand for the use of the owner; Take drawer No. 2 con-
taining bees and brood comb — place the same in the
chamber of an empty hive — keep the entrance of the hive
closed for three or four days, giving the bees clean water
every day — then open the hive and they have a queen larvae
State and will immediately resume their ordinary
labors, and nurse and support their young queen during
the season.

Fifthly — To supply swarms which have lost their
queen, with a new one; insert the drawer containing
a queen prepared as in the foregoing experiment in the
chamber of the hive to be supplied and the object is
accomplished.

Sixthly — To prevent the depredations of the Bee moth.
When a swarm leaves a hive and the same is thereby so
reduced in number that a quantity of the comb is left un=
occupied, take the queen from the swarm which has
issued from the hive — collect the rest of the swarm
in a drawer and replace them in the chamber of the hive
from which the swarm issued and the design is effected,
inasmuch as the moth does not commit its depredations,
to any considerable extent except when there are unoccupied
combs.

Note. The slides and drawers are to be used
in all experiments in the manner described in the first
of the foregoing ones, and slide No. 1, is to be used only
with drawer No. 1.

Witnesses
W. D. Barber
Asahel Parsons

John M. Weeks

Ex
Ch[illegible]